United States Patent [19]

Higo et al.

[11] Patent Number: 5,133,841
[45] Date of Patent: Jul. 28, 1992

[54] PROCESS FOR MANUFACTURING AN ELECTRICALLY CONDUCTIVE POLYMER IN THE FORM OF A FILM

[75] Inventors: Shinji Higo; Minoru Orita, both of Kanagawa, Japan

[73] Assignee: Kabushiki Kaisha Komatsu Seisakusho, Japan

[21] Appl. No.: 460,059

[22] PCT Filed: Jul. 22, 1988

[86] PCT No.: PCT/JP89/00743

§ 371 Date: Mar. 19, 1990

§ 102(e) Date: Mar. 19, 1990

[87] PCT Pub. No.: WO89/01007

PCT Pub. Date: Feb. 9, 1989

[30] Foreign Application Priority Data

Jul. 24, 1987 [JP] Japan .................. 62-183765

[51] Int. Cl.$^5$ .............................. C25B 3/02
[52] U.S. Cl. ..................... 204/59 R; 204/78; 252/500

[58] Field of Search ............ 204/59 R, 72, 78; 252/500

[56] References Cited

U.S. PATENT DOCUMENTS 4,629,540 12/1986 Geniees et al. ............... 204/59 R
5,002,700 3/1991 Otagawa et al. ............. 204/59 R

*Primary Examiner*—Steven Marquis
*Attorney, Agent, or Firm*—Ronald P. Kananen

[57] ABSTRACT

A process is described for producing a conductive polymer of an aromatic amine for the purpose of forming a dense and relatively thick film having a uniform, smooth surface as well as good adhesion strength and film strength. This process comprises dissolving or dispersing an aromatic amine compound in a substituted or unsubstituted aromatic sulfonic acid solution and conducting electrolytic oxidative polymerization, said aromatic sulfonic acid having a molecular weight up to 300 and a relatively large ionic radius and being dissolved in a concentration of 0.01 to 5 mol/l.

13 Claims, No Drawings

PROCESS FOR MANUFACTURING AN ELECTRICALLY CONDUCTIVE POLYMER IN THE FORM OF A FILM

FIELD OF THE INVENTION

This invention relates to a process for manufacturing an electrically conductive polymer. More particularly, this invention relates to a process which can easily and effectively manufacture, by electrolytic oxidative polymerization, an electrically conductive high-molecular aromatic amine compound in the form of a film having excellent electrochemical properties, and uniformity and good strength. The film can be used for making a wide variety of products including plastic cells, capacitors, device sensors and display components.

BACKGROUND OF THE INVENTION

There are various known processes for synthesizing polyanilines, which are typical aromatic amine polymers. They can be roughly classified into (i) chemical synthesis, and (ii) electrolytic oxidative polymerization. The chemical synthesis of polyanilines has been known for a long time, as reported by A. G. Green and A. E. Woodhead, J. Chem. Soc., 2388 (1910). This process is carried out by, for example, placing aniline in hydrochloric acid and adding ammonium persulfate, $(NH_4)_2S_2O_8$, as an initiator. The resulting polyaniline is a powder. After it has been washed, collected, dried, etc., it is molded under pressure to form pellets which are ready for use. The electrolytic oxidative polymerization is carried out by dissolving aniline in an aqueous solution of a protonic acid, placing a "Nesa" glass electrode and a metal electrode in the solution, and applying a DC voltage or an electric current to cause the deposition of a polymer on the anode.

A great deal of attention has recently come to be paid to polyanilines as the materials for electrodes forming cells, since they exhibit excellent electrochemical properties. Studies have been directed particularly to the electrochemical synthesis of polyanilines, as in this way it is possible to produce polyanilines in layer form [A. G. MacDiarmid et al., Mol. Cryst. Lig. Cryst., Vol. 121 (1985), pp. 187–190].

The electrochemical synthesis of polyanilines, however, has a serious drawback. Although it is possible to form a good film as long as only a small quantity of electricity, say, up to 1 C (coulomb)/$cm^2$, is employed, the passage of a larger quantity of electricity results in the formation of a mass of powder which is coherent on the electrode surface, but loses cohesion upon drying. This powder has a low apparent density and easily falls off the electrode. The use of a higher electric current results in a more powdery product.

Therefore, the electrochemically synthesized polyaniline is also essentially a powder when formed in a thick layer, and basically differs from other electrochemically synthesized conductive polymers, such as polythiophenes, polypyrroles and polyparaphenylenes. Therefore, the polyanilines have also been in pellets of like form as the electrode materials, but have been considered as being unable to achieve as high an output density as that which can be obtained by any other conductive polymer in film form. Accordingly, a great deal of research efforts have been made to realize polyanilines in film form. For example, Japanese Patent Application laid open under No. 149628/1985 states that the addition of amines and a substance forming ammonium ions is effective for the production of polyanilines by electrolytic oxidative polymerization.

An inorganic protonic acid is employed in any of the processes for the electrochemical synthesis of polyanilines as hereinabove described. However, the thick polyaniline film which is formed electrochemically by using a protonic acid such as sulfuric, perchloric, hydrochloric, tetrafluoroboric or nitric acid, is so low in adhesive strength that it falls off the substrate easily during washing, as hereinabove stated. It is also low in mechanical strength. When the conventional polyaniline is used for making a cell, it is necessary to mold it into pellets or like form, as it is essentially a powder, and the resulting cell has, therefore, an output strength which is lower than that of a cell formed from other conductive polymers.

SUMMARY OF THE INVENTION

Under these circumstances, it is a basic object of this invention to provide a process for manufacturing an aromatic amine polymer, such as polyaniline, in film form by electrolytic oxidative polymerization.

It is another object of this invention to provide a process for manufacturing an electrically conductive aromatic amine polymer in the form of a relatively thick film having a uniform and smooth surface, and good adhesive strength, mechanical strength, density and quality.

These objects are essentially attained by a process for manufacturing an electrically conductive polymer in the form of a film which comprises dissolving or dispersing an aromatic amine compound in a solution of a substituted or unsubstituted aromatic sulfonic acid, and subjecting this solution or dispersion to electrolytic oxidative polymerization.

As a result of our research work, we, the inventors of this invention, have found that a dense and relatively thick film of an aromatic amine polymer having high mechanical strength can be formed by the electrolytic oxidative polymerization of an aromatic amine compound if an aromatic sulfonic acid is used as an acid catalyst.

A very tough polypyrrole film can be formed by electrolytic oxidative polymerization if a bulky backing salt, i.e. one having a large ionic radius, is employed. We have concluded that it is likewise possible to form a dense polyaniline film having high mechanical strength by employing an acid having a large acid group (anionic part of a protonic acid).

According to a salient feature of this invention, the electrolytic oxidative polymerization of aniline or similar compounds is carried out by using an aromatic sulfonic acid preferably having a molecular weight of 300 or below and a relatively large ionic radius, such as p-toluenesulfonic acid, benzenesulfonic acid, m-nitrobenzenesulfonic acid, naphthyl-1-sulfonic acid or naphthyl-2-sulfonic acid.

A polar solvent, such as water or alcohol, may be used as the solvent. The use of water, however, causes a power loss, as its electrolysis consumes a part of an electric current. Therefore, and also in view of the possibility of a better film being formed from a solution having higher acid and monomer concentrations, it is preferable to use alcohol, which has a higher power of dissolving the acid and monomer than water. The use of alcohol makes it possible to deposit a beautiful film composed of finer particles. The solution preferably contains the aromatic sulfonic acid at a concentration of 0.01 to 5 mols per liter. This concentration is usually lower than the level corresponding to the solubility of the aromatic sulfonic acid in the solvent.

Various kinds of alcohols can be used as the solvent. They include monohydric alcohols, such as methyl alcohol, ethyl alcohol, n-propyl alcohol, i-propyl alcohol, n-butyl alcohol, i-butyl alcohol, sec-butyl alcohol, tert-butyl alcohol, amyl alcohols (including the isomers) and hexyl alcohols (including the isomers), and polyhydric alcohols, such as ethylene glycol, propylene glycol and glycerin. One of these alcohols, or a mixture of two or more alcohols is used. It is also possible to use a mixed solvent containing at least one kind of alcohol, for example, an aqueous solution of alcohol.

Although aniline is typical of the aromatic amine compounds which are polymerized by the process of this invention, it is also suitable for application to N-methylaniline, N,N-dimethylaniline, o-phenylenediamine, and other aromatic amines or diamines, or derivatives of aromatic amine compounds.

It is possible to form a thick polymer film by applying for electrolysis a voltage which is at least equal to the redox potential of aniline, i.e. 0.65 V/SCE, for example, a potential of at least 0.8 V, or preferably from 1 to 1.8 V, between the electrodes (or a standard potential below 1 V, or preferably of 0.8 V or below).

These and other objects, features and advantages of this invention will become apparent from the following description description to anybody of ordinary skill in the art.

DETAILED DESCRIPTION OF THE INVENTION

The invention will now be described more specifically with reference to examples thereof and comparative examples.

COMPARATIVE EXAMPLE 1

A "Nesa" glass (In-Sn conductive glass) plate was immersed as the anode, and a nickel plate as the cathode, in an aqueous solution containing 1 mol of sulfuric acid and 1 mol of aniline per liter. A voltage of 1.2 V was applied between the electrodes, whereupon a green film was deposited on the surface of the anode. The "Nesa" glass electrode had a surface area of $2 \times 3$ cm$^2$. The reaction was continued until the electric current which had been passed amounted to 5 C/cm$^2$, whereby a thick polyaniline film was formed. The film was washed in distilled water and methanol. The polyaniline, however, came off the "Nesa" glass surface and could not be completely recovered. The polyaniline which had fallen into the water and methanol was essentially powdery or granular. The film had a bulk density of about 0.2 g/cm$^3$.

COMPARATIVE EXAMPLE 2

Attempts were made to synthesize polyaniline by following the procedures of Comparative Example 1, except that HBF$_4$ was used instead of sulfuric acid. Although a somewhat improved adhesive strength could be achieved over what had been obtained in Comparative Example 1, about a half of the attempts resulted in the separation of the films from the "Nesa" glass surfaces.

EXAMPLE 1

Polyaniline was synthesized by following the procedures of Comparative Example 1, except that p-toluenesulfonic acid was used instead of sulfuric acid. A very tough film was formed. It showed no peeling during washing. After it had been dried at 60° C. under reduced pressure, it could be separated from the "Nesa" glass surface to provide a free-standing film. It had a bulk density of 0.4 g/cm$^3$.

EXAMPLE 2

Polyaniline was synthesized by following the procedures of Comparative Example 1, except that benzenesulfonic acid was used instead of sulfuric acid. A very tough film was formed. It showed no peeling during washing.

EXAMPLE 3

Polyaniline was synthesized by following the procedures of Example 1, except that m-nitrobenzenesulfonic acid was used instead of p-toluenesulfonic acid. A very tough film was formed. It showed no peeling during washing.

EXAMPLE 4

A "Nesa" glass plate was immersed as the anode, and a nickel plate as the cathode, in an aqueous solution containing 2 mols of p-toluenesulfonic acid and 0.1 mol of o-phenylenediamine per liter. A voltage of 1.2 V was applied between the electrodes, whereupon a brown film was deposited on the anode surface. The reaction was continued until the electric current which had been passed amounted to 5 C/cm$^2$, whereby an o-phenylenediamine polymer film was formed. It was washed and dried. It was tough and showed no peeling or separation from the substrate.

EXAMPLE 5

An o-phenylenediamine polymer was synthesized by following the procedures of Example 4, except that m-nitrobenzenesulfonic acid was used instead of p-toluenesulfonic acid. A tough polymer film was formed. It showed no peeling off the substrate.

APPLICATION EXAMPLE 1

Each of the films which had been obtained in the Comparative Examples and the Examples of this invention as hereinabove described was evaluated from an electrochemical standpoint as applied to cells. The results are shown in TABLE 1.

COMPARATIVE EXAMPLE 3

A chemically synthesized polyaniline powder was obtained by placing aniline in an aqueous solution containing hydrochloric acid at a concentration of 1 mol/dm$^3$, and adding ammonium persulfate as an initiator, in accordance with the process described in J. Chem. Soc., Faraday Trans. I., 82 (1986), pp. 2385-2400. After the powder had been treated with ammonia, it was washed, dried, and subjected to Soxhlet extraction using acetonitrile as the solvent. Then, the powder was dried again, and molded at a pressure of 300 kg/$^2$ into pellets having a diameter of 22.5 mm. The pellets had a thickness of 200 microns and a density of about 10 g/cm$^3$.

TABLE 1

| Example No. | | Polymer | Acid used for synthesis | Cell construction | Voc (V) | Energy density (Ah/kg) | Max. output density (kW/kg) |
|---|---|---|---|---|---|---|---|
| Comparative Example | 1 | Polyaniline | Sulfuric acid | PAn/LiBF$_4$,PC/Li | 3.8 | 80 | 1.8 |
| | 2 | Polyaniline | HBF$_4$ | PAn/LiBF$_4$,PC/Li | 3.8 | 100 | 1.6 |
| Example of the Invention | 1 | Polyaniline | p-toluene sulfonic acid | PAn/LiBF$_4$,PC/Li | 3.8 | 100 | 3.5 |
| | 2 | Polyaniline | Benzenesulfonic acid | PAn/LiBF$_4$,PC/Li | 3.8 | 80 | 3.2 |
| | 3 | Polyaniline | m-nitrobenzene-sulfonic acid | PAn/LiBF$_4$,PC/Li | 3.8 | 80 | 3.3 |
| | 4 | Poly-phenylene-diamine | p-toluene-sulfonic acid | PPDA/LiBF$_4$,PC/Li | 3.75 | 60 | 3.2 |
| | 5 | Poly-phenylene-diamine | m-nitrobenzene-sulfonic acid | PPDA/LiBF$_4$,PC/Li | 3.7 | 55 | 3.5 |

EXAMPLE 6

An attempt was made to synthesize polyaniline by following the procedures of Comparative Example 1, except that a methyl alcohol solution was used instead of the aqueous solution and contained 2 mols of p-toluenesulfonic acid per liter instead of sulfuric acid. A very tough film was formed. There was no peeling of polyaniline off the substrate during washing.

EXAMPLE 7

Polyaniline was synthesized by following the procedures of Comparative Example 1, except that a methyl alcohol solution was used instead of the aqueous solution and contained 2 mols of benzenesulfonic acid per liter instead of sulfuric acid. A very tough film was obtained. There was no peeling of polyaniline off the substrate during washing.

EXAMPLE 8

Polyaniline was synthesized by following the procedures of Comparative Example 1, except that a methyl alcohol solution was used instead of the aqueous solution and contained 2 mols of m-nitrobenzenesulfonic acid per liter instead of sulfuric acid. A very tough film was obtained. There was no peeling off the substrate during washing.

EXAMPLE 9

A polymer was synthesized by following the procedures of Comparative Example 1, except that a methyl alcohol solution was used instead of the aqueous solution and contained 0.1 mol of p-toluenesulfonic acid per liter instead of sulfuric acid and 0.01 mol of o-phenylenediamine per liter instead of aniline. A very tough film was obtained. There was no peeling off the substrate during washing.

EXAMPLE 10

Polyaniline was synthesized by following the procedures of Example 6, except that ethyl alcohol was used instead of methyl alcohol. A very tough film was obtained. There was no peeling of polyaniline off the substrate during washing.

APPLICATION EXAMPLE 2

Examination was made of the physical and electrochemical properties of each of the films which had been obtained in Comparative Examples 1 and 3 and Examples 6 to 10. The results are shown in TABLE 2

TABLE 2

| Example No. | | Polymer | Acid used for synthesis | Bulk density g/cm$^3$ | Separation from substrate* | Voc (V) | Energy density (Ah/kg) | Max. output density (kW/kg) |
|---|---|---|---|---|---|---|---|---|
| Comparative Example | 3 | Polyaniline | Hydrochloric acid | 1.0 | — | 3.6 | 40 | 0.03 |
| | 1 | Polyaniline | Sulfuric acid | 0.2 | × | 3.75 | 80 | 1.8 |
| Example of the Invention | 6 | polyaniline | p-toluene sulfonic acid | 0.4 | ○ | 3.75 | 100 | 3.9 |
| | 7 | Polyaniline | Benzenesulfonic acid | 0.4 | ○ | 3.8 | 80 | 3.3 |
| | 8 | Polyaniline | m-nitrobenzene-sulfonic acid | 0.4 | ○ | 3.75 | 80 | 3.2 |
| | 9 | Poly-o-phenylene-diamine | p-toluene sulfonic acid | 0.3 | ○ | 3.7 | 60 | 3.0 |
| | 10 | Polyaniline | p-toluene sulfonic acid | 0.4 | ○ | 3.7 | 90 | 3.7 |

The process of this invention employs an aromatic sulfonic acid as the acid catalyst for producing a polymer from an aromatic amine compound by electrolytic oxidative polymerization, while the conventional process uses an inorganic acid, as hereinabove described. The polymer is produced in the form of a film having a high bulk density, uniform quality and a smooth surface, as it is composed of densely deposited particles. It is a tough film having high adhesive and mechanical strength. There is no peeling off the substrate of even a thick film formed by passing as large a quantity of electricity as 5 C/cm$^2$, when it is washed, or on any other occasion.

The high mechanical strength of the polymer film made by the process of this invention enables it to be separated from the substrate after drying to provide a strong free-standing film which is desirable from an application standpoint. The product of this invention also exhibits very good electrochemical properties. A cell formed from the film of this invention exhibits a maximum output density of as high as about 3.5 kW/kg which is considerably higher than what can be attained by a cell formed from a pellet.

We claim:

1. A process for manufacturing an electrically conductive polymer in the form of film which comprises dissolving or dispersing in a fluoride ion free solvent an aromatic amine compound and a substituted or unsubstituted aromatic sulfonic acid and subjecting said solution or dispersion to electrolytic oxidative polymerization.

2. A process as set forth in claim 1, wherein said solvent is selected from the groups consisting of water and alcohols.

3. A process as set forth in claim 2, wherein said sulfonic acid solution has an acid concentration of 0.01 to 5 mols per liter.

4. A process as set forth in claim 1, wherein said aromatic sulfonic acid has a molecular weight not exceeding 300, and a relatively large ionic radius.

5. A process as set forth in claim 1, wherein said aromatic amine compound is selected from the aromatic amines and diamines, and derivatives of aromatic amine compounds.

6. The process as claimed in claim 1, wherein said aromatic sulfonic acid is benzenesulfonic acid.

7. A process for manufacturing an electrically conductive polymer in the form of a film comprising a first step of dissolving or dispersing in a fluoride ion free solvent an aromatic amine compound and an acid consisting essentially of a substituted or unsubstituted aromatic sulfonic acid and a second step of subjecting said solution or dispersion to electrolytic oxidative polymerization.

8. The process as set forth in claim 7, wherein said solvent is substantially polar.

9. A process as set forth in claim 7, wherein said solvent is selected from the group consisting of water and alcohol.

10. A process as set forth in claim 7, wherein said aromatic sulfonic acid has a molecular weight not exceeding 300, and a relatively large ionic radius.

11. A process as set forth in claim 7, wherein said aromatic amine compound is selected from the aromatic amines and diamines, and derivatives of aromatic amine compounds.

12. A process as set forth in claim 7, wherein said sulfonic acid solution has an acid concentration of 0.01 to 5 mols per liter.

13. A process for manufacturing an electrically conductive polymer in the form of a film which comprises dissolving or dispersing an aromatic amine compound in a fluoride ion free solution of a substituted or unsubstituted aromatic sulfonic acid selected from the group consisting of p-toluene sulfonic acid, M-nitrobenzene sulfonic acid, napthyl-1-sulfonic acid and naphthyl-2-sulfonic acid, and subjecting said solution or dispersion to electrolytic oxidative polymerization.

* * * * *